United States Patent
Shinkle

(10) Patent No.: US 10,168,716 B2
(45) Date of Patent: Jan. 1, 2019

(54) VALVE POSITION DEMAND SYSTEMS AND METHODS

(71) Applicant: General Electric Company, Schenectady, NY (US)

(72) Inventor: William Randolph Shinkle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 957 days.

(21) Appl. No.: 14/505,383

(22) Filed: Oct. 2, 2014

(65) Prior Publication Data

US 2016/0098042 A1    Apr. 7, 2016

(51) Int. Cl.
   *G05D 7/06*    (2006.01)
   *G05B 15/02*   (2006.01)

(52) U.S. Cl.
   CPC ........... *G05D 7/0635* (2013.01); *G05B 15/02* (2013.01)

(58) Field of Classification Search
   CPC ......... G05D 7/0635; G05B 15/02; F02C 9/18; F02C 9/24; F05D 2270/301
   USPC .................................. 700/282, 289; 60/785
   See application file for complete search history.

(56) References Cited

U.S. PATENT DOCUMENTS

| 4,225,920 A | 9/1980 | Stokes | |
| 4,756,152 A * | 7/1988 | Krukoski | F02C 9/18 60/773 |
| 4,777,603 A | 10/1988 | Woodman et al. | |
| 4,991,389 A * | 2/1991 | Schafer | F02C 9/18 60/39.24 |
| 5,279,109 A * | 1/1994 | Liu | F02C 7/052 60/39.092 |
| 5,301,500 A * | 4/1994 | Hines | F02C 9/16 415/148 |
| 5,313,778 A * | 5/1994 | Sweet | F02C 9/18 60/772 |
| 5,337,722 A * | 8/1994 | Kurihara | F02D 35/0061 123/527 |
| 5,642,989 A * | 7/1997 | Keddie | F04B 49/225 417/298 |
| 6,082,971 A * | 7/2000 | Gunn | F04B 39/066 417/32 |
| 6,851,260 B2 | 2/2005 | Hill | |
| 7,328,098 B1 * | 2/2008 | VanderLeest | F02C 9/18 60/785 |
| 7,702,053 B2 | 4/2010 | Chen et al. | |
| 8,489,342 B2 | 7/2013 | Dugger et al. | |
| 9,272,787 B2 * | 3/2016 | Couture | B64D 13/00 |
| 9,366,194 B2 * | 6/2016 | Feigl | F02C 9/18 |
| 2001/0018824 A1 * | 9/2001 | Leone | F01D 25/12 60/772 |

(Continued)

*Primary Examiner* — Miranda M Huang
*Assistant Examiner* — Olvin Lopez Alvarez
(74) *Attorney, Agent, or Firm* — Fletcher Yoder, P.C.

(57) ABSTRACT

A method includes: obtaining a measurement; determining whether the measurement is in a first range, a second range, or a third range; controlling operation of a valve in a full-freeze mode when the data measurement falls within the first range; controlling the operation of the valve of the turbine system in a semi-freeze mode when the data measurement falls within the second range; and controlling the operation of the valve of the turbine system in a full-operation mode when the data measurement falls within the third range.

17 Claims, 3 Drawing Sheets

(56) References Cited

U.S. PATENT DOCUMENTS

| | | | | |
|---|---|---|---|---|
| 2002/0189263 A1* | 12/2002 | Rayer | ............... | F01D 17/105 |
| | | | | 60/782 |
| 2003/0213452 A1* | 11/2003 | Pomerleau | ............. | F01L 1/30 |
| | | | | 123/90.29 |
| 2004/0226290 A1* | 11/2004 | Bailey | ............... | F01N 3/0214 |
| | | | | 60/297 |
| 2004/0260482 A1* | 12/2004 | Tanaka | ............... | F02D 11/105 |
| | | | | 702/45 |
| 2007/0110587 A1* | 5/2007 | Takeshita | ............. | F02C 7/236 |
| | | | | 417/26 |
| 2007/0251239 A1* | 11/2007 | Huber | ................... | F02C 3/13 |
| | | | | 60/682 |
| 2009/0011288 A1* | 1/2009 | Perry | ............. | H01M 8/04029 |
| | | | | 429/414 |
| 2010/0281875 A1* | 11/2010 | Price | ................ | F01D 17/162 |
| | | | | 60/772 |
| 2010/0286889 A1* | 11/2010 | Childers | ............... | F02C 6/08 |
| | | | | 701/100 |
| 2012/0317058 A1* | 12/2012 | Abhulimen | ......... | G06N 99/005 |
| | | | | 706/2 |
| 2013/0104516 A1* | 5/2013 | Varillas | ................. | F02C 9/18 |
| | | | | 60/39.24 |
| 2013/0269358 A1* | 10/2013 | Wichmann | ............ | F02C 3/34 |
| | | | | 60/772 |
| 2013/0276892 A1* | 10/2013 | Kamp | ............... | F16K 31/122 |
| | | | | 137/1 |
| 2014/0130584 A1* | 5/2014 | Fuller | ................ | G01M 15/14 |
| | | | | 73/114.16 |

* cited by examiner

VALVE POSITION DEMAND SYSTEMS AND METHODS

BACKGROUND OF THE INVENTION

The subject matter disclosed herein relates to valves, and more specifically, to valve position demand.

Turbine systems oftentimes use variable bleed valve systems. The bleed valves may open or close based upon an amount of air that is needed to leave the system. The actuation of a position change in the valve occurs very rapidly (e.g. 100 times per second) and may occur quite frequently. Unfortunately, these frequent and rapid position changes may result in a decrease in valve efficiencies such as decreased valve actuator life.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a valve system includes a valve. The valve includes a valve disk configured to restrict airflow when in a closed position and allow airflow when in an open position and an actuator configured to move the valve disk based upon one or more commands. The valve system also includes a controller configured to provide the one or more commands to the actuator. The controller is configured to obtain a turbine system data measurement; determine which range of a first range, a second range, or a third range the turbine system data measurement falls within; provide the one or more commands to the actuator according to a full-freeze mode when the data measurement falls within the first range; provide the one or more commands to the actuator according to a semi-freeze mode when the data measurement falls within the second range; and provide the one or more commands to the actuator according to a full-operation mode when the data measurement falls within the third range. The full-operation mode: enables provision of the one or more commands to the actuator at a rapid rate and/or enables actuation of the valve disk to a full open position, a full closed position, or both. The full-freeze mode: suspends provision of the one or more commands to the actuator for a pre-determined interval, such that no actuation of the valve disk occurs during the full-freeze mode. The semi-freeze mode: enables provision of the one or more commands to the actuator at an updated rate less than the rapid rate and/or enables actuation of the valve disk to less than the full open position, less than the full closed position, or both.

In a second embodiment, a non-transitory, machine-readable medium, comprising machine-readable instructions to: obtain a turbine system data measurement; determine which range of a first range, a second range, or a third range the turbine system data measurement falls within; control operation of a valve of the turbine system in a full-freeze mode when the data measurement falls within the first range; control the operation of the valve of the turbine system in a semi-freeze mode when the data measurement falls within the second range; and control the operation of the valve of the turbine system in a full-operation mode when the data measurement falls within the third range. The full-operation mode: enables operation of the valve at a rapid rate and/or enables operation of the valve to a full open position, a full closed position, or both. The full-freeze mode: suspends operation of the valve for a pre-determined interval, such that no actuation of the valve occurs during the full-freeze mode. The semi-freeze mode: enables operation of the valve at an updated rate less than the rapid rate and/or enables operation of the valve to less than the full open position, less than the full closed position, or both.

In a third embodiment, a method includes: obtaining a turbine system data measurement; determining which range of a first range, a second range, or a third range the turbine system data measurement falls within; controlling operation of a valve of the turbine system in a full-freeze mode when the data measurement falls within the first range; controlling the operation of the valve of the turbine system in a semi-freeze mode when the data measurement falls within the second range; and controlling the operation of the valve of the turbine system in a full-operation mode when the data measurement falls within the third range. The full-operation mode: enables operation of the valve at a rapid rate and/or enables operation of the valve to a full open position, a full closed position, or both. The full-freeze mode: suspends operation of the valve for a pre-determined interval, such that no actuation of the valve occurs during the full-freeze mode. The semi-freeze mode: enables operation of the valve at a rate less than the rapid update rate and/or enables operation of the valve to less than the full open position, less than the full closed position, or both.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A turbine system may include an intercooler or heat exchanger suitable for cooling certain turbine fluids, such as compressed air. The intercooler may be disposed internal to the turbine system or external to the turbine system. The intercooler may include two main mechanical chambers, a shell chamber and a tube bundle chamber. Hot fluid (e.g., air) may be directed from the turbine system into the shell chamber for heat exchange purposes. The hot fluid may result in the hot shell chamber (i.e., outer chamber) exchanging thermal energy with cold fluid (e.g., liquid coolant) in the cold tube bundle chamber (i.e., inner chamber). A bleed valve may be used to expunge pressured air from the intercooler. The bleed valve may open or close based upon an amount of air that is needed to leave the system. In certain scenarios the actuation of a position change in the valve occurs very rapidly (e.g. 100 times per second). Using the systems and methods described herein, the actuation, in some situations, may be retarded. The retardation may result in increased efficiencies such as an increased valve actuator life.

Figure 1:
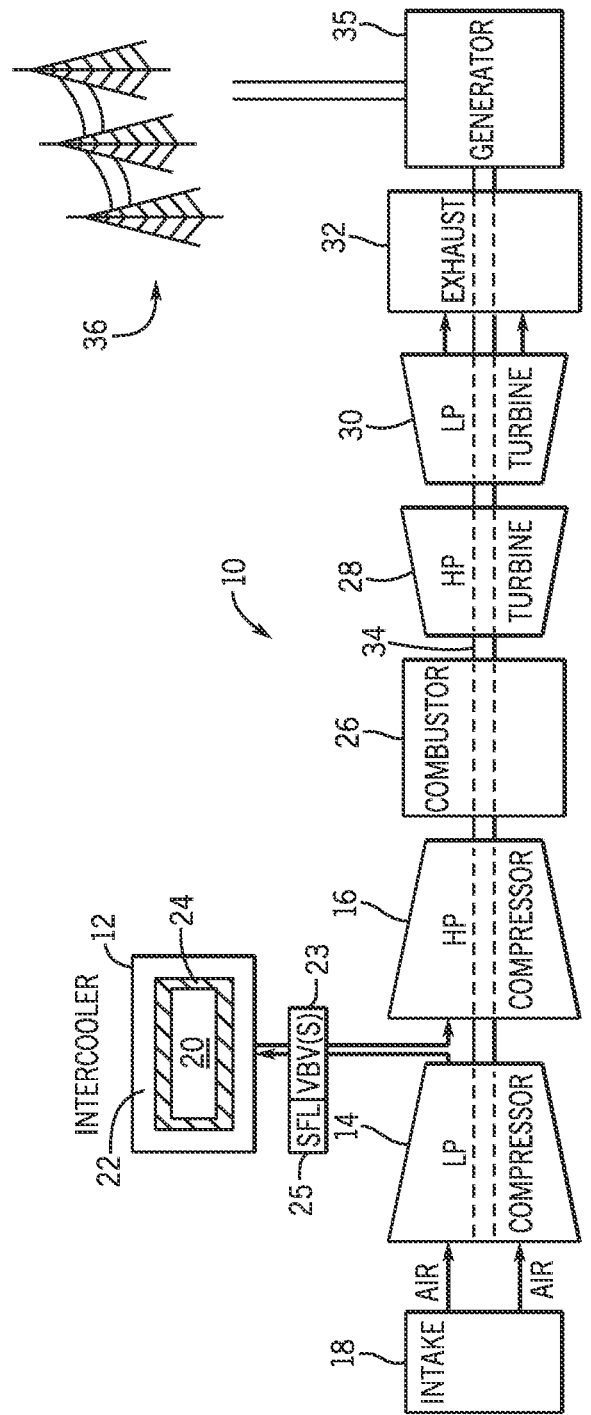
FIG. 1 is a block diagram an embodiment of a turbine system with semi-freeze enabled variable bleed valves, in accordance with an embodiment.

FIG. 1 illustrates an embodiment of a turbine system 10 that may be used to provide power, such as electrical and/or mechanical power. Certain of the turbine systems 10, such as the LMS100 turbine system 10 available from General Electric Co., of Schenectady, N.Y., may include an intercooler 12. It is to be understood that the turbine system 10 may be any turbine system designed to convert fuel into a rotative power. Accordingly, different arrangements of turbine components may be used, and FIG. 1 describes a representative example. The intercooler 12 may increase the efficiency of the turbine system 10, for example, by cooling a hot fluid (e.g., compressed air) directed from a low pressure (LP) compressor 14, and directing the cooled fluid (e.g., compressed air) into a high pressure (HP) compressor 16. For example, a fluid, such as air, may enter an intake 18 and become compressed by the LP compressor 14. The air compressed by the LP compressor 14 may gain thermal energy (i.e., heat) during compression. For example, the compressed air may be at a temperature of approximately between 50° to 300° Farenheit. The higher temperature air may then be directed into the intercooler 12. The intercooler 12 may include two chambers, e.g., an inner tube bundle chamber 20 and an outer shell chamber 22. The hot air may enter the outer shell chamber 22, and exchange heat with the cooler inner tube bundle chamber 20, thus reducing the temperature of the hot air. In certain embodiments, the inner tube bundle chamber 20 may flow a cooling fluid, such as water to transfer heat away from the hot air to produce cooler air. The cooler air may then be directed into the HP compressor 16. By cooling the air provided to the HP compressor 16, higher energy efficiencies may be achieved. For example, the cooler air may reduce the work of compression in the HP compressor 16, while increasing mass flow of air into the turbine system 10, thus increasing overall efficiency.

A seal 24 is disposed between the inner tube chamber 20 and the outer shell chamber 22, so as to block fluid flow (e.g., leakage) between both chambers 20 and 22. The chamber 20 and/or 22 may thermally expand and contract, in some cases, exhibiting movement between approximately 0.5 cm and 10 cm. In certain embodiments, the seal 24 may also expand to follow the expansion of the chamber 20, while also maintaining a suitable barrier to fluid flows between the chambers 20 and 22. Indeed, the seal 24 may expand and contract to suitably block fluid flows (e.g., leakage); even in sealed locations having bends or curves, thus improving the overall efficiency of the turbine system 10.

In some embodiments, one or more variable bleed valves (VBVs) 23 may be positioned between the turbine (e.g., the LP compressor 14 and/or the HP compressor 16) and the intercooler 12. The VBVs 23 may be useful in increasing efficiency and preventing possible stalls at starting, idling, and high speed operation. The VBVs 23 adjust airflow to components of the turbine system 10 (e.g., the HP compressor 16) by opening and/or closing the VBVs 23. The VBVs 23 typically manage large volumes of highly-pressurized air. Further VBV 23 adjustments typically occur very rapidly by stroking the valves from full close to full open in a fractional time period. For example, some VBVs 23 actuate from full close to full open (e.g., a 90 degree actuation in the valve opening) in a matter of less than 220 milliseconds.

Unfortunately, as mentioned above, these VBV 23 adjustments may occur quite frequently. For example, many VBVs 23 are controlled in a manner that provides these rapid VBV 23 adjustments whenever the system 10 is not in a steady state, causing valve dithering and/or chatter (e.g., the VBV 23 adjustments may occur over 100 times per second). This excessive dithering and/or chatter may lead to unnecessary wear on high-pressure hydraulics of the VBVs 23 and/or seals of the VBVs 23, resulting in leaks within the VBVs 23 or other inefficiencies within the VBVs 23. This may lead to increased costs by requiring premature repair and/or replacement, which may be quite costly.

Accordingly, as will be discussed in more detail below, the VBVs 23 of system 10 includes semi-freeze logic 25, which may retard the number of adjustments of the VBVs 23, thus prolonging the life of the VBVs 23. The semi-freeze logic 25 may include non-transitory, machine-readable instructions, stored in machine-readable storage media. The instructions may be implemented by a controller of the VBVs 23 or any other processor of the system 10 and/or the VBVs 23.

As depicted, the turbine system 10 may also include a combustor 26, which receives and combusts a fuel air mixture to generate hot pressurized exhaust gases. The turbine system 10 directs the exhaust gases through a high pressure (HP) turbine 28 and a low pressure (LP) turbine 30 toward an exhaust outlet 32. The HP turbine 28 may be part of a HP rotor. Similarly, the LP turbine 30 may be part of a LP rotor. As the exhaust gases pass through the HP turbine 28 and the LP turbine 30, the gases force turbine blades to rotate a drive shaft 34 along an axis of the turbine system 10. As illustrated, the drive shaft 34 is connected to various components of the turbine system 10, including the HP compressor 16 and the LP compressor 14. It is to be understood that, other turbine systems may include intermediate pressure compressors, intermediate pressure turbines, and other arrangement of component systems, including shaft arrangements and couplings to the generator 35.

The drive shaft 34 may include one or more shafts that may be, for example, concentrically aligned. The drive shaft 34 may include a shaft connecting the HP turbine 28 to the HP compressor 16 to form a HP rotor. The HP compressor 16 may include blades coupled to the drive shaft 34. Thus, rotation of turbine blades in the HP turbine 28 causes the shaft connecting the HP turbine 28 to the HP compressor 16 to rotate blades within the HP compressor 16. This compresses air in the HP compressor 16. Similarly, the drive shaft 34 includes a shaft connecting the LP turbine 30 to the LP compressor 14 to form a LP rotor. The LP compressor 14 includes blades coupled to the drive shaft 34. Thus, rotation of turbine blades in the LP turbine 30 causes the shaft connecting the LP turbine 30 to the LP compressor 14 to rotate blades within the LP compressor 14. The compressed air is fed to the combustor 26 and mixed with fuel to allow for higher efficiency combustion. Thus, the turbine system 10 may include a dual concentric shafting arrangement, wherein LP turbine 30 is drivingly connected to LP compressor 14 by a first shaft in the drive shaft 34, while the HP turbine 28 is similarly drivingly connected to the HP compressor 16 by a second shaft in the drive shaft 34 internal and concentric to the first shaft. The shaft 34 may also be connected to an electrical generator 35 or any other load, such as a mechanical load. The generator 35 may be connected to an electrical distribution grid 36 suitable for distributing the electricity produced by the generator 35.

Figure 2:
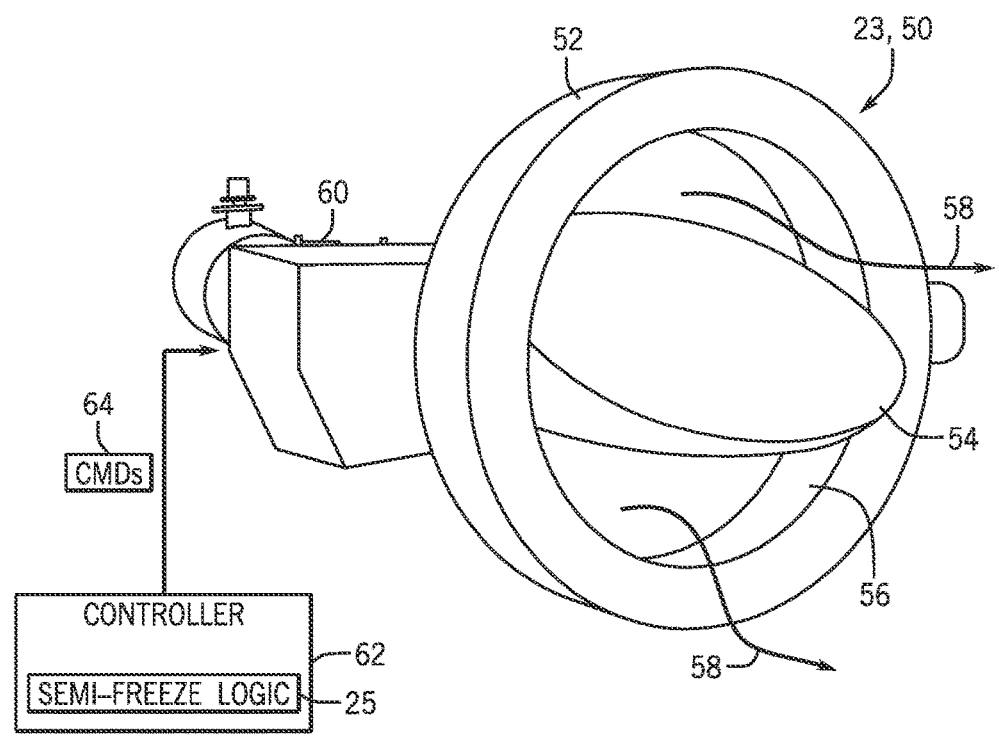
FIG. 2 is a perspective view of an embodiment of a semi-freeze enabled variable bleed valve system.

FIG. 2 is a schematic view of a VBV 23 controlled by semi-freeze logic 25, in accordance with an embodiment. As illustrated, in some embodiments, the VBVs 23 may include a butterfly valve 50 having a body 52, a disk 54, and a seat 56. Air flow 58 may be controlled by the VBVs 23 by use of an actuator 60 that modifies the position of the disk 54 with respect to the body 52. In some embodiments, the actuator 60 may include a hydraulic system that enables rapid movement of the disk 54. For example, the disk 54 may be positioned within the body 52, such that when the actuator 60 controls a position of the disk to a 90 degree angle with respect to the body 52, the air flow 58 may maximally flow through the body 52. When the actuator 60 controls a position of the disk to a 0 degree angle with respect to the body 52, the disk 54 may come in contact with the seat 56, causing little to no air flow 58 to pass through the body 52.

As mentioned above, the actuator 60 may be controlled by a controller 62. The controller 62 may be a processor-based device that provides commands 64 to the actuator 60. In some embodiments, the commands 64 may be position demands for the VBVs 23. Further, the controller 62 may be part of the VBV 23 system and/or a part of the overall system 10. The controller 62 may include semi-freeze control logic 25, which may reduce the amount of movement of the disk 54. This reduction in movement may increase the effective life of the VBV 23 by reducing seat 56 and/or actuator 60 wear.

Figure 3:
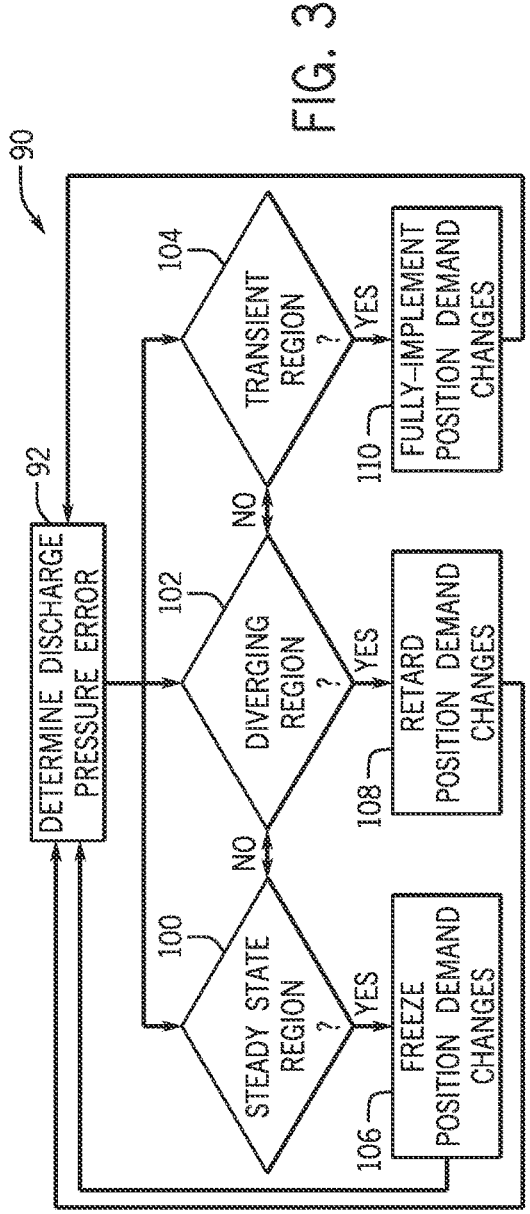
FIG. 3 is a flowchart illustrating a process for modifying position demand in a semi-freeze enabled variable bleed valve, in accordance with an embodiment.
Figure 4:
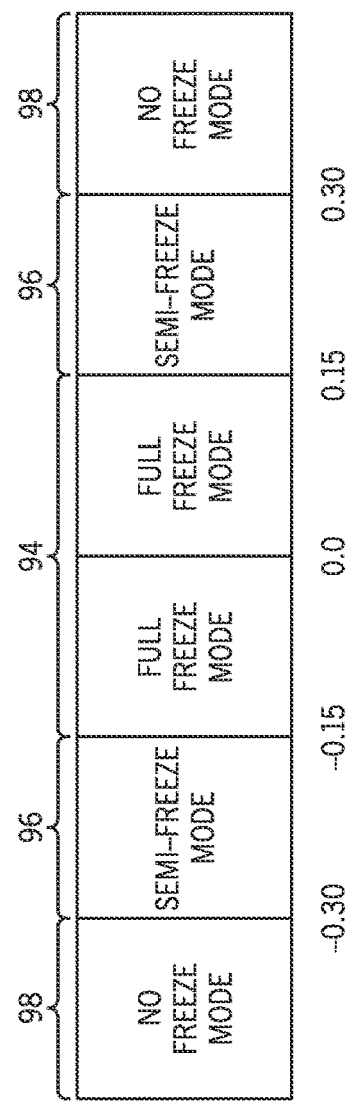
FIG. 4 is a range chart illustrating ranges for implementing a semi-freeze mode in a valve, in accordance with an embodiment.

Having now discussed some of the benefits of the semi-freeze logic 25, FIG. 3 is a flow-diagram illustrating a process 90 for controlling the VBV 23 via semi-freeze logic 25, in accordance with an embodiment. Further, FIG. 4 is a schematic diagram illustrating various regions of error that may be used to define the regions for the semi-freeze logic 25, in accordance with an embodiment. FIGS. 3 and 4 will be discussed together.

As mentioned above, the position magnitude and/or rate of actuations for the VBVs 23 may be modified in order to reduce wear on the VBVs 23. Actuation logic may include instructions that provide a full-freeze mode that completely halts actuation of the VBVs 23. For example, in full-freeze mode, when an engine using the VBVs 23 is running in steady state (e.g., pressure rate across the booster of the system 10 is running to schedule), the demand (e.g., the position demand) of the VBVs 23 is frozen, thus restricting movement of the VBV 23 opening.

Unfortunately, with heat soak, grid frequency changes, the power demand on engine, etc., steady state may be infrequently achieved, resulting in the VBVs that are not in full-freeze mode. Accordingly, the actuation logic may also include instructions for a full-operation mode. The full-operation mode may be enabled when full-operation of the VBVs 23 is needed (e.g., when a booster discharge pressure error is high). During full-operation mode, each position demand provided to the VBVs is processed. For example, the valve position demand may change very frequently (e.g., over 100 times per second).

Unfortunately, as discussed above, the use of full-freeze and full-operation modes may still result in a relatively high number of actuations to the VBVs 23. Accordingly, to counter-act this high frequency of actuations, a semi-freeze mode using the semi-freeze logic 25 may be implemented in the control of the VBVs transition or diverging region between full-freeze and no-freeze modes may be implemented. In the diverging region, the frequency of accepted position demand changes may be reduced and/or the magnitude of the position demand changes may be reduced.

The process 90 for actuation including the semi-freeze mode begins by determining one or more measurements useful for determining a particular range of values where different actuation rates and/or magnitudes may be implemented (block 92). For example, FIG. 4 illustrates ranges of booster discharge pressure errors (e.g., the difference between an expected booster discharge pressure and an actual booster discharge pressure) that may define a steady-state region 94, a diverging region 96, and a full-operation region 98. The steady-state region 94 may be a region represented by −0.015 to 0.015 psi booster discharge pressure error, the diverging region 96 may be defined by the ranges −0.15 to −0.30 psi and 0.15 to 0.30 psi, and the full-operation region 98 may be represented by the ranges of less than or equal to −0.30 psi and greater than or equal to 0.30 psi.

As may be appreciated, these ranges are provided as approximations. A number of different ranges may define the regions 94, 96, and 98. Indeed, these regions may be defined in a site-specific and/or implementation specific manner based upon the particular equipment of an implementation and/or particular operator desire. For example, in some embodiments, the regions 94, 96, and 98 may be defined by deviations in the ranges above by 0.5%, 1%, 10%, 15%, 20% or more.

Once the measurement (e.g., the discharge pressure error) is determined, the process 90 continues by determining whether the discharge pressure error is in the steady state region (decision block 100), the diverging region (decision block 102), or the transient region (block 104). For example, using the ranges provided in FIG. 4, a 0.12 psi or −0.12 psi would fall within the steady state region 94, a −0.18 psi or 0.18 psi measurement would fall within the diverging region 96, and a −0.48 psi or 0.48 psi measurement would fall within the transient region 98.

If the measurement falls within the steady state region 94, the full-freeze mode is implemented freezing position demand changes (block 106). If the measurement falls within the diverging region, the semi-freeze mode may be activated, retarding position demand changes within the VBVs 23 (block 108). When the measurement falls within the transient region 98, a full-operation mode may be activated, which allows for full implementation of the position demand changes (block 110).

When the full-freeze mode is active, valve position demand changes are ignored after a particular amount of time (e.g., 15 seconds) at a steady state condition. Thus, during this ignore time, the valve will not actuate from open to close or vice versa, which may help the system 10 to stay in a steady state. As long as the VBVs 23 stay in the steady state, actuation of the VBVs 23 will be frozen.

As changes occur within the system 10, (e.g., grid frequency changes, power demand changes on the engine, heat soak changes, etc.) the status of the system may diverge from the steady state, while still not experiencing an urgent error state. This may be represented by the diverging region 96. When the semi-freeze mode is active, the position demand changes are retarded (block 108). For example, in the semi-freeze mode, a number of allowed position demand changes to the VBVs 23 may be greater than the full-freeze state (e.g., greater than zero) and less than a number of allowed position demand changes allowed during the full-operation mode (e.g., less than 100 changes per second). In some embodiments, position demand changes will be allowed once per second. In some embodiments, the rate and/or magnitude of position demand changes may be limited via optimization parameters provided by the system 10 and/or an operator of the system 10 to the controller 62.

Further, the magnitude of the position demand change may be greater than the magnitude allowed in the full-freeze state (e.g., greater than a zero degree change) and less than a magnitude of position demand changes allowed during the full-operation mode (e.g., less than a 90 degree change). Thus, during the semi-freeze mode execution, the number of position demand changes and the magnitude of the position demand changes may be reduced. By enabling fewer adjustments with a smaller magnitude, the error may oftentimes be remedied, resulting in system returning to the steady state, where the full-freeze mode may be used. Accordingly, the VBVs 23 may experience less dithering, which may reduce wear on the actuator 60 and/or the seat 56.

If the errors worsen, the measurement will fall within the transient region 98, which will activate the full-operation mode. In the full-operation mode, the position demand changes will be allowed to occur more frequently and/or with a greater magnitude than when the semi-freeze mode is active. Accordingly, the full-operation more may more rapidly respond to pressure errors within the system 10. The full-operation mode may continue until new measurements indicate that the status of the system has changed to the diverging region and/or the stead state region, where the semi-freeze mode and/or the full-freeze mode may be implemented, respectively.

Technical effects of the current application include controlling a variable bleed valve to implement semi-freeze logic that stabilizes the value in a manner that places the system into a steady state. By creating this additional stability, position demand changes of the variable bleed valves may be reduced, adding to the longevity of the valve system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A valve system, comprising:
   a valve, comprising:
   a valve disk configured to restrict airflow when in a closed position and avow airflow when in an open position; and
   an actuator configured to move the valve disk based upon one or more commands; and
   a controller configured to provide the one or more commands to the actuator, wherein the controller is configured to:
   obtain a turbine system data measurement, comprising a discharge pressure error;
   determine which range of a steady-state range, a diverging range, or a transient range the turbine system data measurement falls within, wherein the diverging range is between the steady-state range and the transient range;
   provide the one or more commands to the actuator according to a full-freeze mode when the data measurement falls within the steady-state range;
   provide the one or more commands to the actuator according to a semi-freeze mode when the data measurement falls within the diverging range; and
   provide the one or more commands to the actuator according to a full-operation mode when the data measurement falls within the transient range;
   wherein the full-operation mode:
   enables provision of the one or more commands to the actuator at a first predetermined rate;
   enables selective actuation of the valve disk from a full open position to a full closed position, and from the full closed position to the full open position;
   or both;
   wherein the full-freeze mode:
   suspends provision of the one or more commands to the actuator for a predetermined interval, such that no actuation of the valve disk occurs during the full-freeze mode; and
   wherein the semi-freeze mode:
   enables provision of the one or more commands to the actuator at a second predetermined rate less than the first predetermined rate;
   enables selective actuation of the valve disk from less than the full open position to less than the full closed position, and from less than the full closed position to less than the full open position;
   or both.

2. The valve system of claim 1, wherein the steady-state range comprises: greater than −0.15 psi and less than 0.15 psi, wherein the diverging range comprises: greater than −0.30 psi and less than or equal to −0.15 psi and greater than or equal to 0.15 psi and less than 0.30 psi, and wherein the transient range comprises: less than or equal to −0.3 and greater than or equal to 0.3.

3. The valve system of claim 1, wherein the valve comprises the controller.

4. The valve system of claim 1, wherein the controller is separate from the valve.

5. The valve system of claim 1, wherein the valve comprises a variable bleed valve.

6. The valve system of claim 1, wherein the valve comprises a butterfly valve.

7. The valve system of claim 1, wherein the semi-freeze mode is configured to reduce the magnitude of the position of the valve.

8. A non-transitory, machine-readable medium, comprising machine-readable instructions to:
   obtain a turbine system data measurement, comprising a discharge pressure error;

determine which range of a steady-state range, a diverging range, or a transient range the turbine system data measurement falls within;
control operation of a valve of the turbine system in a full-freeze mode when the data measurement falls within the steady-state range;
control the operation of the valve of the turbine system in a semi-freeze mode when the data measurement falls within the diverging range; and
control the operation of the valve of the turbine system in a full-operation mode when the data measurement falls within the transient range;
wherein the full-operation mode:
  enables operation of the valve at a first predetermined rate;
  enables selective operation of the valve from a full open position to a full closed position, and from the full closed position to the full open position;
  or both;
wherein the full-freeze mode:
  suspends operation of the valve for a pre-determined interval, such that no actuation of the valve occurs during the full-freeze mode; and
wherein the semi-freeze mode:
  enables operation of the valve at a second predetermined rate less than the first predetermined rate;
  enables selective operation of the valve from less than the full open position to less than the full closed position, and from less than the full closed position to less than the full open position;
  or both.

9. The non-transitory, machine-readable medium of claim 8, wherein the steady-state range comprises: greater than −0.15 psi and less than 0.15 psi, wherein the diverging range comprises: greater than −0.30 psi and less than or equal to −0.15 psi and greater than or equal to 0.15 psi and less than 0.30 psi, and wherein the transient range comprises: less than or equal to −0.3 and greater than or equal to 0.3.

10. The non-transitory, machine-readable medium of claim 8, wherein the first predetermined rate comprises approximately greater than or equal to 100 position demand changes per second.

11. The non-transitory, machine-readable medium of claim 8, wherein the second predetermined rate less than the first predetermined rate comprises approximately 1 position demand change per second.

12. The non-transitory, machine-readable medium of claim 8, wherein the pre-determined interval comprises 15 seconds.

13. The non-transitory, machine-readable medium of claim 8, comprising instructions to:
continuously:
  obtain at least one subsequent turbine system data measurements;
  determine which range of the steady-state range, the diverging range, or the transient range the at least one subsequent turbine system data measurements falls within;
  control operation of the valve of the turbine system in the full-freeze mode when the at least one subsequent data measurement falls within the steady-state range;
  control the operation of the valve of the turbine system in the semi-freeze mode when the at least one subsequent data measurement falls within the diverging range; and
  control the operation of the valve of the turbine system in the full-operation mode when the at least one subsequent data measurement falls within the transient range.

14. A method, comprising:
obtaining a turbine system data measurement, comprising a discharge pressure error;
determining which range of a steady-state range, a diverging range, or a transient range the turbine system data measurement falls within;
controlling operation of a valve of the turbine system in a full-freeze mode when the data measurement falls within the steady-state range;
controlling the operation of the valve of the turbine system in a semi-freeze mode when the data measurement falls within the diverging range; and
controlling the operation of the valve of the turbine system in a full-operation mode when the data measurement falls within the transient range;
wherein the full-operation mode:
  enables operation of the valve at a first predetermined rate;
  enables selective operation of the valve from a full open position to a full closed position, and from the full closed position to the full open position;
  or both;
wherein the full-freeze mode:
  suspends operation of the valve for a pre-determined interval, such that no actuation of the valve occurs during the full-freeze mode; and
wherein the semi-freeze mode:
  enables operation of the valve at a second predetermined rate less than the first predetermined rate;
  enables selective operation of the valve from less than the full open position to less than the full closed position, and from less than the full closed position to less than the full open position;
  or both.

15. The method of claim 14, comprising:
continuously:
  obtaining at least one subsequent turbine system data measurements;
  determining which range of the steady-state range, the diverging range, or the transient range the at least one subsequent turbine system data measurements falls within;
  controlling operation of the valve of the turbine system in the full-freeze mode when the at least one subsequent data measurement falls within the steady-state range;
  controlling the operation of the valve of the turbine system in the semi-freeze mode when the at least one subsequent data measurement falls within the diverging range; and
  controlling the operation of the valve of the turbine system in the full-operation mode when the at least one subsequent data measurement falls within the transient range.

16. The method of claim 14, wherein controlling the operation of the valve comprises actuating a valve disk between 0 to 90 degrees.

17. The method of claim 14, wherein the steady-state comprises: greater than −0.15 psi and less than 0.15 psi, wherein the diverging range comprises: greater than −0.30 psi and less than or equal to −0.15 psi and greater than or equal to 0.15 psi and less than 0.30 psi, and wherein the transient range comprises: less than or equal to −0.3 and greater than or equal to 0.3.

\* \* \* \* \*